(12) United States Patent
Ramzan et al.

(10) Patent No.: US 11,487,873 B2
(45) Date of Patent: Nov. 1, 2022

(54) RISK SCORE GENERATION UTILIZING MONITORED BEHAVIOR AND PREDICTED IMPACT OF COMPROMISE

(71) Applicant: EMC IP Holding Company LLC, Hopkinton, MA (US)

(72) Inventors: Zulfikar A. Ramzan, Saratoga, CA (US); Sashka T. Davis, Vienna, VA (US); Kevin J. Arunski, Sterling, VA (US); Ed G. Quackenbush, Oakton, VA (US); Scott Moore, Fredericksburg, VA (US); Kevin T. Douglas, Vienna, VA (US); Abram Thielke, Leesburg, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 936 days.

(21) Appl. No.: 16/253,455

(22) Filed: Jan. 22, 2019

(65) Prior Publication Data
US 2020/0233955 A1 Jul. 23, 2020

(51) Int. Cl.
*G06F 21/55* (2013.01)
*G06F 9/50* (2006.01)

(52) U.S. Cl.
CPC .......... *G06F 21/554* (2013.01); *G06F 9/5027* (2013.01)

(58) Field of Classification Search
CPC .... G06F 21/554; G06F 9/5027; G06F 9/5011; G06F 2209/508; G06F 21/552
See application file for complete search history.

(56) References Cited

U.S. PATENT DOCUMENTS

| | | | |
|---|---|---|---|
| 7,546,295 B2 * | 6/2009 | Brave ................. | G06F 16/9535 709/224 |
| 8,495,745 B1 | 7/2013 | Schrecker et al. | |
| 9,239,908 B1 * | 1/2016 | Constantine ............ | G06F 21/55 |
| 9,292,695 B1 * | 3/2016 | Bassett ................. | G06F 21/577 |
| 9,516,053 B1 * | 12/2016 | Muddu ............... | H04L 63/1416 |
| 9,537,880 B1 * | 1/2017 | Jones ..................... | G06F 21/554 |

(Continued)

OTHER PUBLICATIONS

Santosh S. Vempala, "The Random Projection Method," Center for Discrete Mathematics and Theoretical Computer Science (DIMACS), Oct. 13, 2006, 48 pages.

(Continued)

*Primary Examiner* — David Garcia Cervetti
(74) *Attorney, Agent, or Firm* — Ryan, Mason & Lewis, LLP

(57) ABSTRACT

A method includes monitoring user behavior in an enterprise system, identifying a given user of the enterprise system associated with a given portion of the monitored user behavior, determining a predicted impact of compromise of the given user on the enterprise system, generating a risk score for the given user based on the predicted impact of compromise and the given portion of the monitored user behavior, and identifying one or more remedial actions to reduce the risk score for the given user. The method also includes implementing, prior to detecting compromise of the given user, at least one of the remedial actions to modify a configuration of at least one asset in the enterprise system, the at least one asset comprising at least one of a physical computing resource and a virtual computing resource in the enterprise system.

20 Claims, 5 Drawing Sheets

(56) References Cited

U.S. PATENT DOCUMENTS

| | | | | |
|---|---|---|---|---|
| 9,838,407 | B1* | 12/2017 | Oprea | H04L 63/1416 |
| 10,044,745 | B1* | 8/2018 | Jones | G06F 21/55 |
| 10,212,176 | B2* | 2/2019 | Wang | H04L 63/1425 |
| 10,291,638 | B1* | 5/2019 | Chandana | H04L 67/10 |
| 10,313,384 | B1* | 6/2019 | Banga | H04L 63/20 |
| 10,326,778 | B2* | 6/2019 | Gong | H04L 63/1425 |
| 10,553,321 | B2* | 2/2020 | Hayward | G06Q 50/163 |
| 10,581,896 | B2* | 3/2020 | Nachenberg | G06N 20/00 |
| 10,587,640 | B2* | 3/2020 | Steelman | H04L 63/0209 |
| 10,592,938 | B2* | 3/2020 | Hogg | G06Q 30/0641 |
| 10,594,714 | B2* | 3/2020 | Crabtree | H04L 63/20 |
| 10,601,845 | B2* | 3/2020 | Ben Ezra | H04L 63/1433 |
| 10,733,311 | B2* | 8/2020 | Chen | H04W 12/02 |
| 2003/0159070 | A1* | 8/2003 | Mayer | G06F 21/53 726/1 |
| 2004/0034794 | A1* | 2/2004 | Mayer | G06F 21/567 709/224 |
| 2008/0307525 | A1 | 12/2008 | Nickle | |
| 2009/0271863 | A1* | 10/2009 | Govindavajhala | G06F 21/577 726/25 |
| 2010/0125911 | A1* | 5/2010 | Bhaskaran | G06Q 10/10 715/781 |
| 2010/0153156 | A1* | 6/2010 | Guinta | G06Q 10/0635 705/7.28 |
| 2011/0289588 | A1* | 11/2011 | Sahai | G06Q 90/00 726/25 |
| 2013/0097709 | A1* | 4/2013 | Basavapatna | H04L 63/20 726/25 |
| 2014/0046863 | A1* | 2/2014 | Gifford | G06Q 10/10 705/325 |
| 2014/0237545 | A1* | 8/2014 | Mylavarapu | H04L 63/1441 726/25 |
| 2015/0156086 | A1* | 6/2015 | Chesla | G06N 5/02 709/224 |
| 2015/0195232 | A1* | 7/2015 | Haugen | H04L 47/56 709/206 |
| 2015/0244699 | A1* | 8/2015 | Hessler | H04W 12/062 726/7 |
| 2015/0278729 | A1* | 10/2015 | Hu | G06Q 10/0635 705/7.28 |
| 2015/0310215 | A1 | 10/2015 | McBride et al. | |
| 2015/0334129 | A1* | 11/2015 | Moyle | H04L 63/20 726/1 |
| 2016/0004862 | A1* | 1/2016 | Almehmadi | G06F 21/6218 726/25 |
| 2016/0078365 | A1* | 3/2016 | Baumard | G06N 20/00 706/12 |
| 2016/0173509 | A1* | 6/2016 | Ray | H04L 63/1425 726/23 |
| 2016/0173510 | A1* | 6/2016 | Harris | H04L 63/20 726/23 |
| 2016/0173525 | A1* | 6/2016 | Thomas | H04L 63/145 726/23 |
| 2016/0197798 | A1* | 7/2016 | Britt | H04L 67/306 370/254 |
| 2016/0218933 | A1* | 7/2016 | Porras | H04L 63/20 |
| 2016/0248794 | A1 | 8/2016 | Cam | |
| 2016/0291553 | A1* | 10/2016 | Hsu | G05B 13/0265 |
| 2016/0330219 | A1* | 11/2016 | Hasan | H04L 63/1408 |
| 2016/0364801 | A1* | 12/2016 | Dintenfass | G06Q 40/06 |
| 2017/0134418 | A1* | 5/2017 | Minoli | H04L 63/1433 |
| 2017/0251013 | A1* | 8/2017 | Kirti | H04L 63/1441 |
| 2017/0295181 | A1* | 10/2017 | Parimi | H04L 63/1433 |
| 2017/0310692 | A1* | 10/2017 | Ackerman | H04L 63/1458 |
| 2017/0310693 | A1* | 10/2017 | Howard | H04L 63/166 |
| 2017/0310703 | A1* | 10/2017 | Ackerman | H04L 63/1425 |
| 2017/0324768 | A1* | 11/2017 | Crabtree | H04L 63/1433 |
| 2017/0332238 | A1* | 11/2017 | Bansal | H04L 67/125 |
| 2017/0353483 | A1* | 12/2017 | Weith | G06F 16/23 |
| 2017/0357922 | A1* | 12/2017 | Li | G06Q 10/0635 |
| 2017/0359220 | A1* | 12/2017 | Weith | H04L 41/0893 |
| 2017/0359306 | A1* | 12/2017 | Thomas | H04L 63/145 |
| 2018/0013771 | A1* | 1/2018 | Crabtree | H04L 63/1416 |
| 2018/0027006 | A1* | 1/2018 | Zimmermann | H04L 63/0227 726/11 |
| 2018/0048534 | A1* | 2/2018 | Banga | H04L 63/1433 |
| 2018/0048668 | A1* | 2/2018 | Gupta | H04L 63/1425 |
| 2018/0159852 | A1* | 6/2018 | Crabtree | H04L 63/1433 |
| 2018/0205793 | A1* | 7/2018 | Loeb | G06T 19/003 |
| 2018/0219888 | A1* | 8/2018 | Apostolopoulos | G06F 16/9024 |
| 2018/0285580 | A1* | 10/2018 | Chen | G06F 21/316 |
| 2018/0295154 | A1* | 10/2018 | Crabtree | H04L 63/1433 |
| 2018/0332063 | A1* | 11/2018 | Ford | H04L 67/535 |
| 2018/0357144 | A1* | 12/2018 | Pasanen | G06Q 50/08 |
| 2018/0367329 | A1* | 12/2018 | Shin | H04L 12/2825 |
| 2018/0375886 | A1* | 12/2018 | Kirti | H04L 67/10 |
| 2019/0124112 | A1* | 4/2019 | Thomas | H04L 67/104 |
| 2019/0245713 | A1* | 8/2019 | Lo | H04L 12/2834 |
| 2020/0092318 | A1* | 3/2020 | Luo | G06F 21/55 |
| 2020/0169427 | A1* | 5/2020 | Wu | H04M 1/72412 |
| 2020/0210590 | A1* | 7/2020 | Doyle | G06N 20/00 |
| 2020/0286016 | A1* | 9/2020 | Singh | G06N 20/00 |

OTHER PUBLICATIONS

V.D. Blondel et al., "Fast Unfolding of Communities in Large Networks," Journal of Statistical Mechanics: Theory and Experiment, Oct. 9, 2008, 12 pages, vol. 2008, No. 10.

T.G. Kolda et al., "Tensor Decompositions and Applications," Society for Industrial and Applied Mathematics (SIAM) Review, Aug. 2009, pp. 455-500, vol. 51, No. 3.

Beéla Bollobás, "Modern Graph Theory," Graduate Texts in Mathematics, 1998, 4 pages, vol. 184.

Olle Häggström, "Finite Markov Chains and Algorithmic Applications," London Mathematical Society Student Texts, 2001, 125 pages.

Wade Shen, "Active Social Engineering Defense (ASED)," DARPA Information Innovation Office (DOD-DARPA-I2O), Nov. 9, 2017, 15 pages.

J. Leskovec et al., "Mining of Massive Datasets," Cambridge University Press, 2011, 513 pages.

* cited by examiner

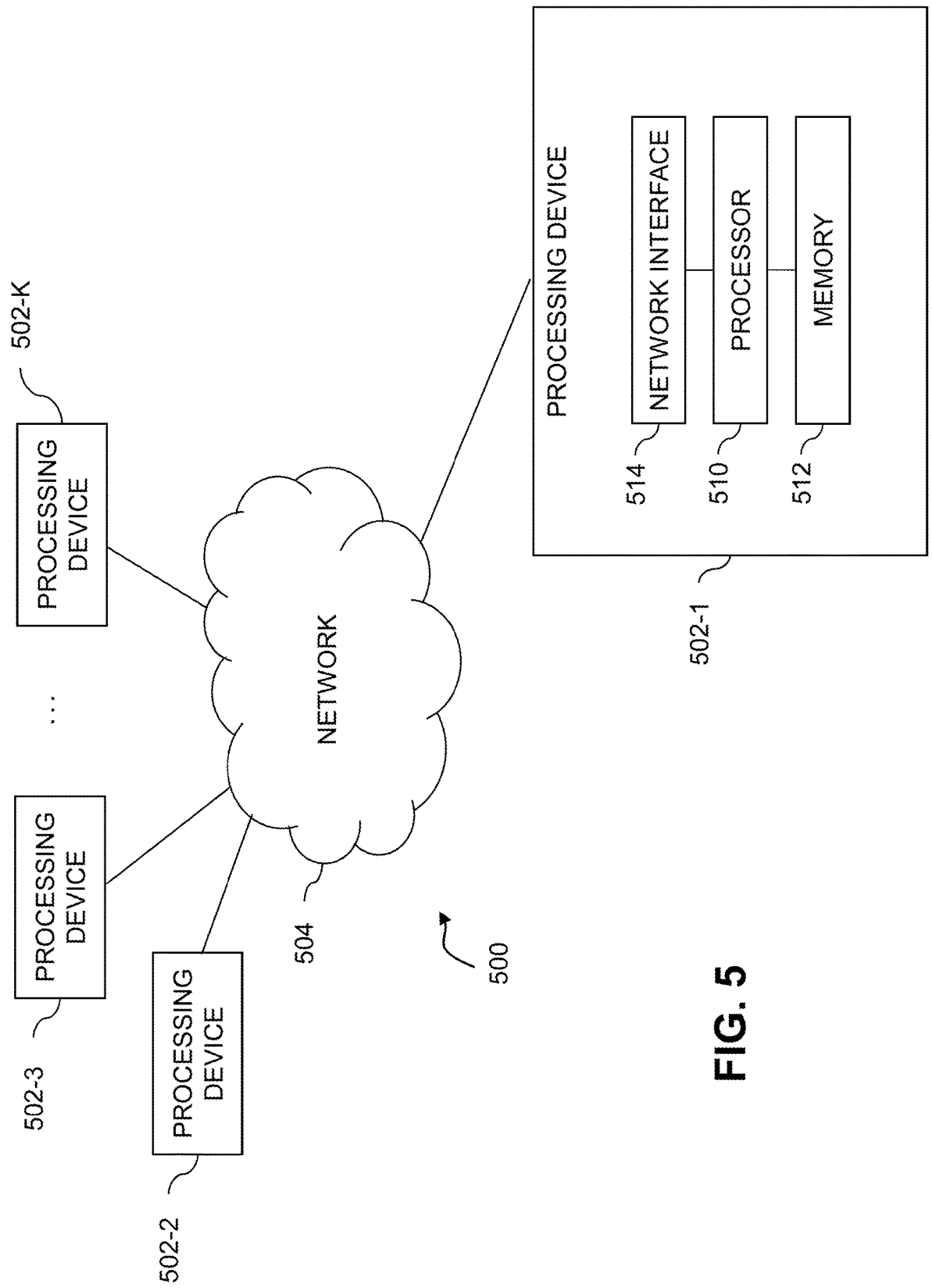

US 11,487,873 B2

RISK SCORE GENERATION UTILIZING MONITORED BEHAVIOR AND PREDICTED IMPACT OF COMPROMISE

FIELD

The field relates generally to information security, and more particularly to detection of security threats in enterprise systems.

BACKGROUND

Various entities are subject to different types of security threats. Some security threats relate to networking and computer security for an enterprise system. Security threats include, for example, compromise of users of the enterprise. Compromise of a particular user may present risks that expose one or more other users of the enterprise, as well as assets of an enterprise system. It is difficult to ascertain the risk of compromise of users in enterprise systems, particularly as the number of users and number of assets of an enterprise system grows. The task of monitoring an enterprise system for security threats or other issues thus presents various challenges.

SUMMARY

Illustrative embodiments of the present invention provide techniques for predictive inference of user risk by monitoring user behavior and characterizing predicted impact of compromise of users. In some embodiments, the predictive inference of user risk is utilized to automate actions in an enterprise system to proactively mitigate the risk of compromise of users.

In one embodiment, a method comprises monitoring user behavior in an enterprise system, identifying a given user of the enterprise system associated with a given portion of the monitored user behavior, determining a predicted impact of compromise of the given user on the enterprise system, generating a risk score for the given user based on the predicted impact of compromise and the given portion of the monitored user behavior, identifying one or more remedial actions to reduce the risk score for the given user, and implementing, prior to detecting compromise of the given user, at least one of the remedial actions to modify a configuration of at least one asset in the enterprise system, the at least one asset comprising at least one of a physical computing resource and a virtual computing resource in the enterprise system. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

BRIEF DESCRIPTION OF THE DRAWINGS

FIGS. 4 and 5 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Organizations typically have limited resources when it comes to putting in compensating controls for the risks associated with malicious behavior. One way to address this concern is by holistically inferring the risk associated with specific users, both in terms of their propensity to become compromised and the resulting impact (e.g., probable loss or disruption) of such compromise. Based on this assessment, security resources can be smartly allocated. Illustrative embodiments provide techniques for predictive inference of user risk to meet these and other needs, providing various advantages relative to conventional techniques.

Advantageously, some embodiments emphasize predictive inference rather than waiting for and detecting malicious activity. To do so, some embodiments predict which users (e.g., of an enterprise system) are more likely to get compromised relative to other users based on characteristics and behavior of the users. Some embodiments provide further advantages through a holistic consideration of risk that takes into account both the likelihood of compromise as well as the impact of compromise. Conventional techniques that consider user risk focus on possible compromise rather than probable compromise, and further fail to consider the impact that compromise may have. Some embodiments provide additional advantages through providing an overall ecosystem for managing user risk that provides increased visibility through monitoring, insights gleaned from analysis, and subsequent actions taken through automation and orchestration.

Figure 1:
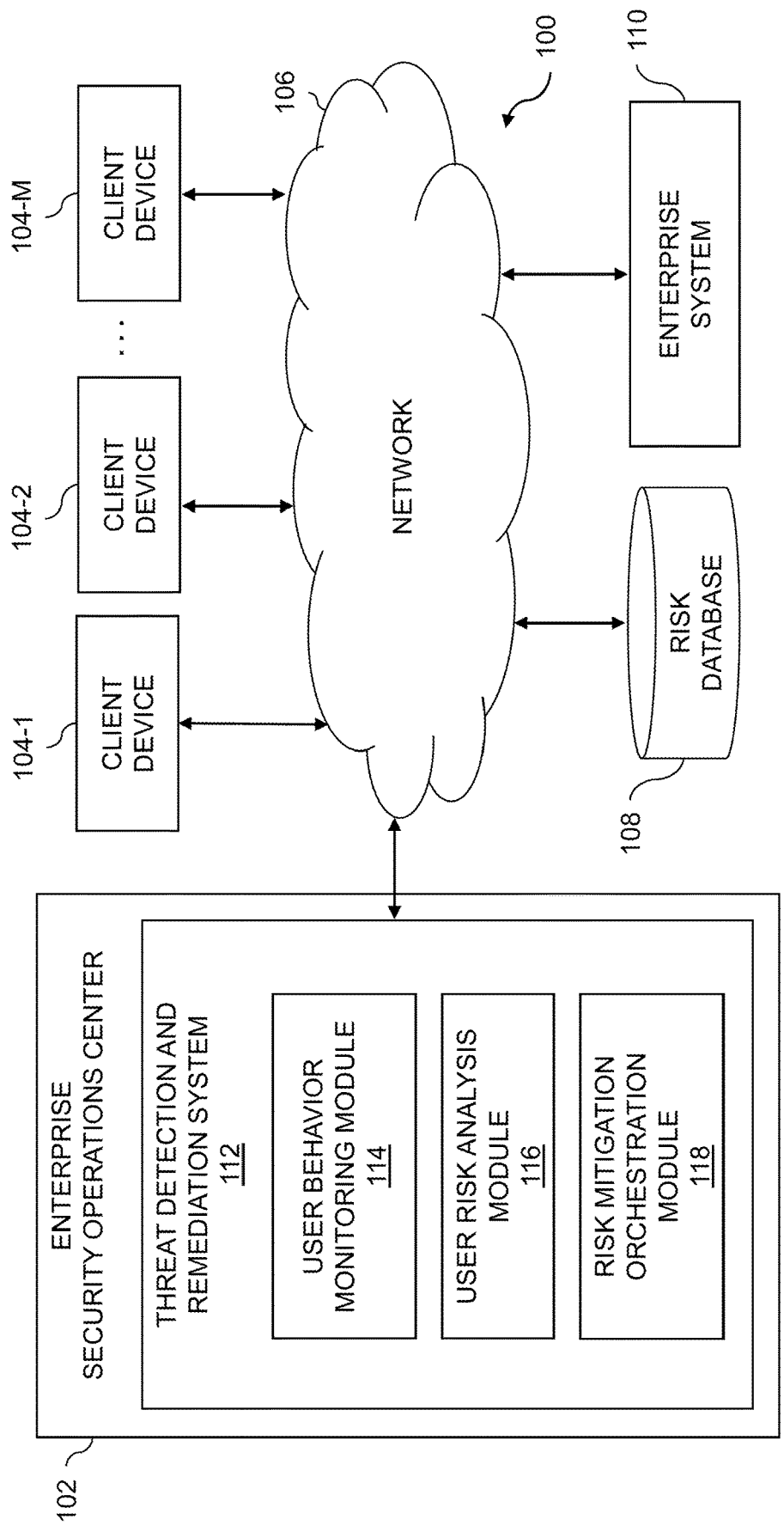
FIG. 1 is a block diagram of an information processing system for predictive inference of user risk in an illustrative embodiment of the invention.

FIG. 1 shows an information processing system 100 configured in accordance with an illustrative embodiment. The information processing system 100 is assumed to be built on at least one processing platform and provides functionality for predictive inference of user risk in an enterprise system 110 comprising a plurality of assets accessed or otherwise utilized by users of an organization or other enterprise. The assets may include, by way of example, physical and virtual computing resources in the enterprise system 110. Physical computing resources may include physical hardware such as servers, storage systems, networking equipment, Internet of Things (IoT) devices, other types of processing and computing devices, etc. Virtual computing resources may include virtual machines (VMs), containers, etc.

In this embodiment, the system 100 more particularly comprises an enterprise security operations center (SOC) 102 and a plurality of client devices 104-1, 104-2, . . . 104-M, collectively referred to herein as client devices 104. The client devices 104 are coupled to a network 106. Also coupled to the network 106 is a risk database 108, which may store various information relating to the impact of compromise of various users as will be described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The risk database 108, as discussed above, is configured to store and record information relating to the impact of compromise of particular users on the enterprise system 110. Such information may include information regarding the structure of an organization or other enterprise that operates the enterprise system 110, the roles of particular users within the organization or other enterprise, information regarding critical processes of the enterprise system 110 including assets utilized by such critical processes, entitlements and delegations regarding access to assets in the enterprise system 110, etc.

The risk database 108 in some embodiments is implemented using one or more storage systems or devices associated with the enterprise SOC 102. In some embodiments, one or more of the storage systems utilized to implement the risk database 108 comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

The client devices 104 are configured to access or otherwise utilize an enterprise system 110. The enterprise system 110 may represent an information technology (IT) infrastructure comprising a plurality of assets (e.g., physical or virtual computing resources) of a business, entity, organization or other enterprise.

In the present embodiment, alerts or notifications generated by a threat detection and remediation system 112 of the enterprise SOC 102 are provided over network 106 to client devices 104, or to a system administrator, IT manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 112. For example, a given security or host agent may comprise a mobile telephone equipped with a mobile application configured to receive alerts from the enterprise SOC 102 or the threat detection and remediation system 112 and to provide an interface for the security agent to select particular remedial measures for responding to the alert or notification. Examples of such remedial measures may include various actions taken to reduce the risk of compromise of users of the enterprise system 110, such as blocking access by one or more users to assets of the enterprise system 110, requiring user input or authentication to obtain information from or otherwise utilize one or more assets of the enterprise system 110, triggering additional training of users, simulating attack scenarios, etc. Remedial measures may also include applying security hardening procedures to assets of the enterprise system 110, establishing new or modified monitoring of assets of the enterprise system 110, changing or adjusting the configuration of assets of the enterprise system 110, etc.

It should be noted that a "security agent" or "host agent" as these terms are generally used herein may comprise an automated entity, such as a software entity running on a processing device. Accordingly, a security agent or host agent need not be a human entity.

As shown in FIG. 1, the enterprise SOC 102 comprises threat detection and remediation system 112. As will be described in further detail below, the threat detection and remediation system 112 is configured to determine risk scores for users of the enterprise system 110, where the risk score for a given user characterizes both the propensity or likelihood of compromise of the given user and the impact of compromise of the given user on the enterprise system 110. The risk scores are utilized by the threat detection and remediation system 112 to proactively take remedial actions to mitigate such risks (e.g., to lower the risk scores).

Although shown as an element of the enterprise SOC 102 in this embodiment, the threat detection and remediation system 112 in other embodiments can be implemented at least in part externally to the enterprise SOC 102, for example, as a stand-alone server, set of servers or other type of system coupled to the network 106. In some embodiments, the threat detection and remediation system 112 may be implemented at least in part within one or more of the client devices 104.

The threat detection and remediation system 112 in the FIG. 1 embodiment is assumed to be implemented using at least one processing device. Each such processing device generally comprises at least one processor and an associated memory, and implements one or more functional modules for controlling certain features of the threat detection and remediation system 112. In the FIG. 1 embodiment, the threat detection and remediation system 112 comprises a user behavior monitoring module 114, a user risk analysis module 116, and a risk mitigation orchestration module 118.

The user behavior monitoring module 114 is configured to monitor the behavior of users in the enterprise system 110, and to identify particular users that are associated with different portions of the monitored user behavior (e.g., different transactions or sets of transactions). The user risk analysis module 116 is configured to determine the predicted impact of compromise of the different users on the enterprise system 110, and to generate risk scores for the users based on their associated predicted impact of compromise and the monitored user behavior for such users. The risk mitigation orchestration module 118 is configured to identify remedial actions that reduce the risk scores for the users of the enterprise system 110, and implements (prior to detecting compromise of the users), such remedial actions to modify the configurations of assets in the enterprise system 110 to reduce the risk scores.

It is to be appreciated that the particular arrangement of the enterprise SOC 102, threat detection and remediation system 112, user behavior monitoring module 114, user risk analysis module 116, and risk mitigation orchestration module 118 illustrated in the FIG. 1 embodiment is presented by way of example only, and alternative arrangements can be used in other embodiments. As discussed above, for example, the enterprise SOC 102, threat detection and remediation system 112, user behavior monitoring module 114, user risk analysis module 116, and risk mitigation orchestration module 118 may in some embodiments be implemented internal to one or more of the client devices 104. As another example, the functionality associated with the user behavior monitoring module 114, user risk analysis module 116, and risk mitigation orchestration module 118 may be combined into one module, or separated across more than three modules with the multiple modules possibly being implemented with multiple distinct processors or processing devices.

At least portions of the user behavior monitoring module 114, user risk analysis module 116, and risk mitigation orchestration module 118 may be implemented at least in part in the form of software that is stored in memory and executed by a processor.

It is to be understood that the particular set of elements shown in FIG. 1 for predictive inference of user risk is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 112 may be implemented external to enterprise SOC 102, such that the enterprise SOC 102 can be eliminated.

In some embodiments, the threat detection and remediation system 112 may be part of or otherwise associated with a system other than the enterprise SOC 102, such as, for example, a critical incident response center (CIRC), a security analytics system, a security information and event management (SIEM) system such as the RSA NetWitness® Platform Evolved SIEM, commercially available from Dell EMC, a Governance, Risk and Compliance (GRC) system, etc.

The threat detection and remediation system 112 and other portions of the system 100, as will be described in further detail below, may be part of cloud infrastructure such as an Amazon Web Services (AWS) system. Other examples of cloud-based systems that can be used to provide the threat detection and remediation system 112 include Virtustream Enterprise Cloud, Virtustream Storage Cloud, Google Cloud Platform (GCP) and Microsoft Azure.

The threat detection and remediation system 112 and other components of the information processing system 100 in the FIG. 1 embodiment are assumed to be implemented using at least one processing platform each comprising one or more processing devices each having a processor coupled to a memory. Such processing devices can illustratively include particular arrangements of compute, storage and network resources.

The client devices 104 and threat detection and remediation system 112 or components thereof (e.g., user behavior monitoring module 114, user risk analysis module 116, and risk mitigation orchestration module 118) may be implemented on respective distinct processing platforms, although numerous other arrangements are possible. For example, in some embodiments at least portions of the threat detection and remediation system 112 and one or more of the client devices 104 are implemented on the same processing platform. A given client device (e.g., 104-1) can therefore be implemented at least in part within at least one processing platform that implements at least a portion of the threat detection and remediation system 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104, threat detection and remediation system 112 or portions or components thereof, to reside in different data centers. Numerous other distributed implementations are possible. The threat detection and remediation system 112 can also be implemented in a distributed manner across multiple data centers.

Additional examples of processing platforms utilized to implement threat detection and remediation system 112 in illustrative embodiments will be described in more detail below in conjunction with FIGS. 4 and 5.

It is to be appreciated that these and other features of illustrative embodiments are presented by way of example only, and should not be construed as limiting in any way.

Figure 2:
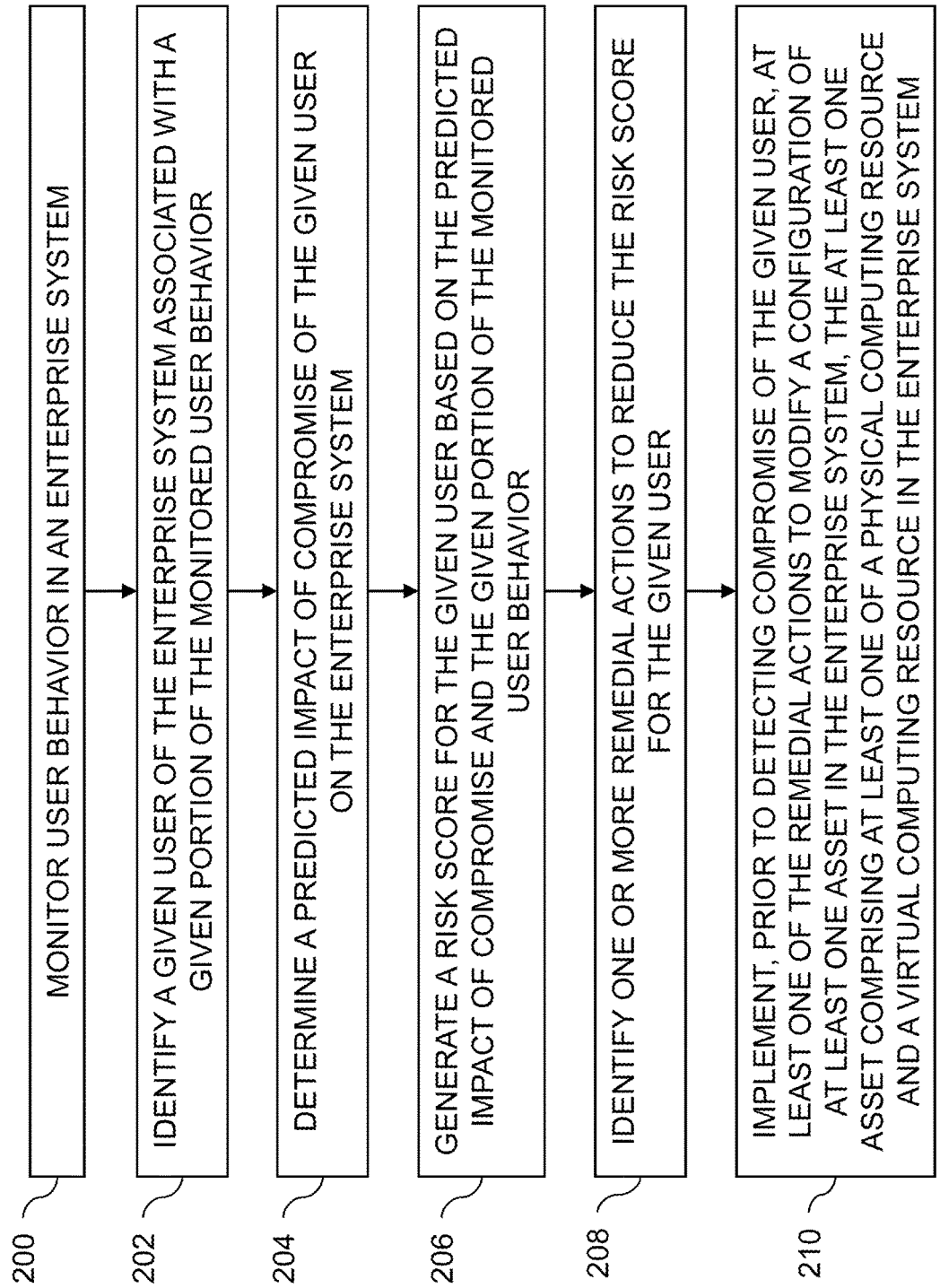
FIG. 2 is a flow diagram of an exemplary process for predictive inference of user risk in an illustrative embodiment.

An exemplary process for predictive inference of user risk in an enterprise system will now be described in more detail with reference to the flow diagram of FIG. 2. It is to be understood that this particular process is only an example, and that additional or alternative processes for predictive inference of user risk can be carried out in other embodiments.

In this embodiment, the process includes steps 200 through 210. These steps are assumed to be performed by the threat detection and remediation system 112 utilizing the user behavior monitoring module 114, the user risk analysis module 116, and the risk mitigation orchestration module 118. The process begins with step 200, monitoring user behavior in an enterprise system such as enterprise system 110. Step 200, in some embodiments, utilizes one or more monitoring tools deploy on assets in the enterprise system, where the assets of the enterprise system include physical and virtual computing resources in the enterprise system. The monitoring tools may include endpoint monitoring tools, network monitoring tools, a cloud services monitoring tools and an IoT gateway monitoring tools, etc.

In some embodiments, monitoring user behavior in step 200 includes analyzing endpoint assets in the enterprise system so as to determine browsing habits of one or more users of a given endpoint asset, installed applications on the given endpoint asset, system configuration of the given endpoint asset, system hygiene of the given endpoint asset, past susceptibility of the given endpoint asset to compromise, critical data stored on the given endpoint asset, access by the given endpoint asset to one or more other designated critical assets in the enterprise system, location of the given endpoint asset, communication habits of the one or more users of the given endpoint asset, etc.

Monitoring user behavior in step 200 may also or alternatively include analyzing network traffic of assets in the enterprise system so as to determine network traffic from a given asset to one or more designated entities, network traffic from the given asset to one or more entities external to the enterprise system, network traffic from the given asset while the given asset is located in one or more designated high risk geographic areas, network traffic between the given asset and one or more entities located in the one or more designated high risk geographic areas, etc.

Monitoring user behavior in step 200 may further or alternatively include analyzing cloud services utilized by assets in the enterprise system so as to determine types of software-as-a-service (SaaS) applications accessed by one or more users of the given enterprise system, data accessed by the one or more users of the given enterprise system via the cloud services, cloud service utilization habits of the one or more users of the given enterprise system, etc.

Step 200 may also or alternatively include monitoring a set of IoT devices via a monitoring tool deployed on an IoT gateway utilized by the set of IoT devices to connect to one or more other assets of the enterprise system.

In step 202, a given user of the enterprise system that is associated with a given portion of the monitored user behavior is identified. The given portion of the monitored user behavior may comprise a transaction of set of transactions as represented by transactional data that is obtained from one or more monitoring tools used in step 200. Step 202 may include associating transactional data to the given user utilizing one or more identifiers in the transactional data, the one or more identifiers comprising at least one of an (IP) address, a Media Access Control (MAC) address, a user name, an email address, a machine name and a host name. Step 202 may also or alternatively include associated transactional data for a given transaction that is obtained from two or more different monitoring tools utilizing at least one of data normalization, document similarity measures and one or more clustering algorithms.

A predicted impact of compromise of the given user on the enterprise system is determined in step 204. The predicted impact of compromise may be based at least in part on a placement of the given user on an organizational chart associated with the given enterprise system, the given user's role within the given enterprise system, the given user's role being determined at least in part based on one or more functions of the given user within the given enterprise system, association of the given user with one or more critical processes of the enterprise system, association of the given user with one or more assets utilized by the one or more critical processes of the enterprise system, entitlements of the given user to access assets of the enterprise system, access privileges delegated to the given user to access assets of the enterprise system, etc.

In step 206, a risk score for the given user is generated based on the predicted impact of compromise determined in step 204 and the given portion of the monitored user behavior identified in step 202. The risk score for the given user, in some embodiments, is a function of time (e.g., the risk for the given user may change over time). Step 206 may include utilizing a heuristic algorithm, a weighted average of two or more risk attributes of the given user, a decision tree based on two or more risk attributes of the given user, one or more machine learning algorithms, etc.

In some embodiments, the risk score for the given user generated in step 206 is a multi-level risk score, where the multi-level risk score comprises an overall risk score at a top level and two or more lower-level risk scores, with the overall risk score being a function of the two or more lower-level risk scores. The two or more lower-level risk scores may include an impact risk score based at least in part on the predicted impact of compromise of the given user determined in step 204, two or more risk attribute scores associated with different types of monitored behavior of the given user obtained in step 200. The risk attributes scores may include a risk attribute score associated with user behavior monitored on endpoint assets of the enterprise system, a risk attribute score associated with user behavior monitored via network traffic of the enterprise system, a risk attribute score associated with user behavior monitored via cloud services, a risk attribute score associated with user behavior monitored via one or more IoT device gateways, etc.

In step 208, one or more remedial actions for reducing the risk score for the given user are identified. Prior to detecting compromise of the given user, at least one of the remedial actions identified in step 208 are implemented in step 210 to modify a configuration of at least one asset in the enterprise system to reduce the risk score for the given user. As noted above, assets in the enterprise system may include physical and virtual computing resources. Various types of remedial actions may be taken, such as applying security hardening procedures to assets in the enterprise system, blocking or revoking access by users to assets, requiring authentication or outside approval to access assets, etc. Additional details regarding these and other remedial actions will be provided below.

One challenge faced by security teams or operators of an enterprise system is apportioning an investment budget (e.g., in terms of monetary resources spent, computing resources spent, etc.) in a way that will maximize the reduction in cyber risk per unit-of-resource spent. To achieve this aim, some embodiments provide techniques for understanding which users of the enterprise system are significant contributors towards cyber risk. Holistic risk quantification, in some embodiments, involves understanding: (i) the likelihood and/or frequency and (ii) impact. With regards to (i) likelihood and frequency, some embodiments seek to determine how likely, how frequently, or how likely and frequently a particular user is to get compromised. With regards to (ii) impact, some embodiments seek to determine the impact or loss magnitude on the enterprise system that is associated with compromise of the user.

It should be noted that components (i) and (ii) each in turn has additional complexity. For example, the (i) likelihood determination may involve looking at numerous sources, including but not limited to a past history of compromise, user behaviors, general user "hygiene" as will be described further detail below, etc. Similar (ii) impact may also be multifaceted. For example, there may be an impact of intellectual property loss, impact to an organization or entity's brand or reputation, legal costs, etc. In addition, some losses may be "primary" and are able to be measured at the onset of compromise (e.g., the loss of intellectual property). Other losses may be "secondary" and happen over time (e.g., the cost of settling a lawsuit in conjunction with a cyber incident).

Illustrative embodiments provide techniques for holistically predicting cyber risk associated with particular users in a way that encompasses both the likelihood of compromise and the impact of such compromise. This is in contrast with conventional techniques that focus around detection of malicious activity when it happens rather than prognosticating such activity in advance and applying security hardening procedures or other remedial action to mitigate the risks associated with compromise before compromise occurs.

To make inferences regarding likelihood, some embodiments examine user behavior as observed from a plurality of vantage points including but not limited to activity on endpoint devices, traffic observed on the network, transactions associated with cloud services, etc. Users who have a high propensity of becoming compromised tend to exhibit common behaviors (e.g., their associated systems and devices may be poorly configured). Similarly, common attributes can help identify those users that have a lower propensity of becoming compromised (e.g., their associated systems and devices may have highly technical applications installed, such as Integrated Development Environment (IDE) or other advanced system tools).

To make inferences regarding probably impact, some embodiments collect attributes associated with a user from a plurality of vantage points. For example, a user's position within an organization or enterprise may be identified (e.g., as determined by Active Directory Lightweight Directory Access Protocol (LDAP) Data Interchange Format (LDIF) logs) and the resources to which they have access (e.g., as determined by any existing risk register or system for Identity Governance and Lifecycle).

In some embodiments, likelihood information is combined with impact information and fed into a user risk scoring engine that produces a list of users and their associated risk scores, together with any salient attributes about the components associated with the risk score. In some embodiments, risk may be computed as a function of time. In particular, compromise of certain assets in an enterprise system may be higher at specific moments or periods of time. For example, if a billing system has peak loads at the end of the month, then the compromise of such a system at that time has a higher impact. Similarly, the impact of compromising certain user accounts can change over time. For example, compromising the system of an organization's Chief Financial Officer (CFO) during a financial quiet period can be particularly dangerous.

The results of the risk analysis performed by the risk scoring engine are fed into a component for orchestration and automation configured to track workflows and put into place automated actions associated with the risk analysis to mitigate the risk of compromise of particular users. Such actions may include installing additional security software onto the systems or devices used by high-risk users (or for other systems and devices in an enterprise system which exchange data or other information with such systems and devices), signing high-risk users up for additional training, blocking access by high-risk users to assets in an enterprise system deemed important (e.g., assets which have an importance above some designated threshold, assets that are comparatively more important to the health of the enterprise system than other assets), etc.

Figure 3:
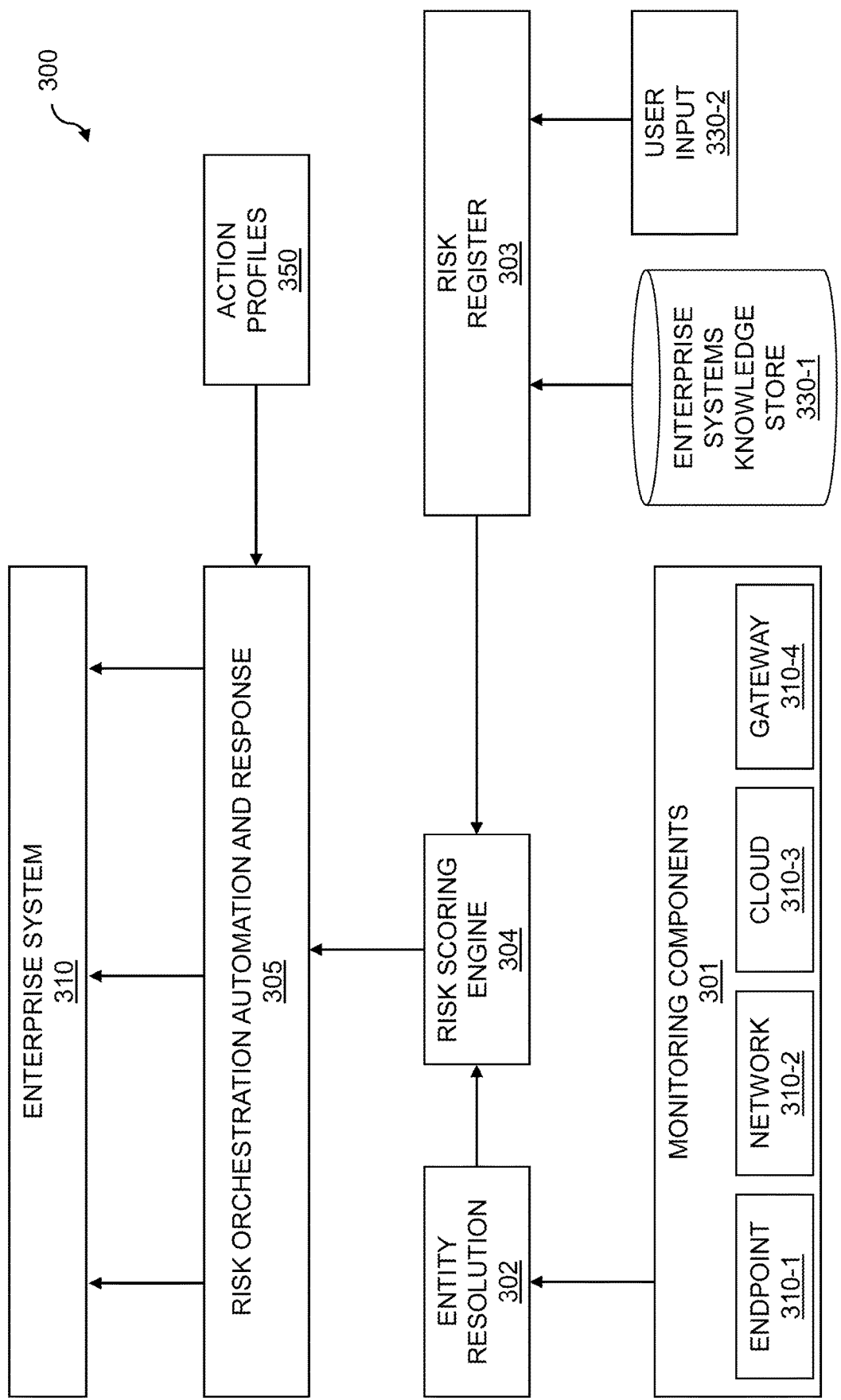
FIG. 3 is a block diagram of an information processing system for predictive inference of user risk to automate remedial actions in an enterprise system in an illustrative embodiment.

FIG. 3 shows a system 300 for predictive inference of user risk, which includes monitoring components 301, an entity resolution component 302, a risk register component 303, a risk scoring engine 304 and an orchestration and automation component 305. The monitoring components 301 observe what is happening across key facets of an organization or other enterprise's information assets as it relates to user risk. These observations are passed to the entity resolution component 302, which identifies common entities across transactions observed from different sources. The risk register component 303 collects data about risk, and provides such information to the risk scoring engine 304. The risk scoring engine 304 utilizes the risk information along with information from the entity resolution component 302 to produces risk scores or other risk metrics for particular users or groups of users. The risk scoring engine 304 provides this information to a risk orchestration automation and response (ROAR) component 305 that drives a set of actions in enterprise system 310 to address user risk.

The monitoring components 301 observe user behavior to predict user risk from a variety of vantage points. The monitoring components 301 may use various tools, including but not limited to endpoint monitoring tools 310-1, network monitoring tools 310-2, cloud monitoring tools 310-3 and gateway or Internet of Things (IoT) monitoring tools 310-4.

The entity resolution component 302 is configured to take as input data that is provided by the monitoring components 301, possibly along with additional contextual information that is obtained from existing enterprise systems, from manual sources, etc. The entity resolution component 302 is configured to identify the user or users who are associated with a specific set of activities in the input data from the monitoring components 301. The challenge for the entity resolution component 302 is to handle data from multiple sources, as there may not be a clear way to identify that a disparate set of activities or data is associated with the same user.

The risk register component 303 is configured to draw upon information from enterprise systems knowledge store 330-1 and/or user input 330-2 to help understand the impact associated with compromise of particular users. The enterprise systems knowledge store 330-1 may represent or include data that is obtained from a plurality of sources such as Active Directory LDIF logs, entitlement data from identity governance and lifecycle systems, asset criticality data from integrated risk management (IRM) or governance, risk and compliance (GRC) systems, critical process data taken from integrated risk management or GRC systems, etc.

The risk scoring engine 304 is configured to take as input data from both the monitoring components 301 (as filtered or processed by the entity resolution component 302) and the risk register component 303. The risk scoring engine 304 in some embodiments computes a set of user risk metrics, such as a risk score or a risk function that can change with time.

The ROAR component 305 is configured to take as input the risks metrics computed by the risk scoring engine 304 and takes various action in enterprise system 310 to mitigate user risk. In some embodiments, this includes the ROAR component 305 directly executing a certain set of actions within the enterprise system 310, creating a workload for tracking actions associated with user risk in the enterprise system 310, etc. To do so, the ROAR component may utilize action profiles 350 as will be described in further detail below.

The monitoring components 301 may be implemented on various systems and devices within the enterprise system 310. As noted above, the monitoring components can monitor user behavior from a plurality of vantage points, examples of which are described in detail below. As each example is described, the relevant of the underlying monitoring capability is also described for purposes of illustrated. It should be appreciated, however, that the monitoring components 301 in some embodiments are focused primarily on collected data that is fed to the entity resolution component 302 that identifies the user or group of users associated with the data. The entity resolution component 302 passes the combined results to the risk scoring engine 304, which weights the relative importance of the collected data items. In addition to collecting behavioral attributes relevant to identifying user risk, the monitoring components 301 as described below may also collect information that helps to identify the underlying user or entity behind various attributes (e.g., IP addresses, a MAC addresses, user names, host names, active directory identifiers, etc.).

The endpoint monitoring components 310-1 in some embodiments provides important details regarding a user's propensity for becoming compromised, as well as the potential impact of such compromise. Since users interact directly with endpoint systems and devices, the information collected from the endpoint monitoring components 310-1 may be particularly useful. In some cases, endpoints may be VMs, container instances or other virtualized resources. It may be possible and desirable to gain deeper visibility into endpoints that are virtualized resources to obtain additional detail on user risk relative to other types of endpoints. Details collected by the endpoint monitoring components 310-1 include, but are not limited to, information related to browsing habits, installed applications, system configuration, system hygiene, past susceptibility, critical data, critical access, location, e-mail habits, etc. Illustrative examples of such information will now be described.

Browsing Habits: users who have a higher propensity for becoming compromised may visit web sites that have a low reputation (e.g., such sites may be relatively new, may have been the victims of prior compromise, etc.). Alternatively, excessive traffic on reputable sites that have low relevance to a user's role within an organization or other enterprise (e.g., excessive time spent on social media sites by a user in the finance department of an enterprise) can be another indicator of propensity to be compromised. On the other hand, some web sites are indicative of users who are more sophisticated, and therefore less likely to be compromised. For example, users who visit highly technical sites meant for developers and other advanced users (e.g., Stack Overflow) have a lower propensity for becoming compromised.

Installed Applications: users who are sophisticated may be expected to have specific tools or other applications installed. For example, an IDE, Sysinternals® tools, common developer tools (e.g., Slack®). Sophisticated users may also install web browsers which are not the default for the endpoint system or device (e.g., Mozilla Firefox® or Google Chrome™ web browsers). Users who are less sophisticated or engage in dangerous habits often install programs that can cause downstream problems. For example, ancillary browser toolbars, third-part software for viewing media, etc. may be indicative of risk of compromise.

System Configuration: users who keep their system up-to-date (e.g., with the latest patches installed) tend to have a lower propensity for compromise. In addition, security software on a particular endpoint may be examined to see if it is configured and functioning correctly. This may include, by way of example, determining whether the signature files for anti-virus software running on the endpoint are up-to-date, determining whether a firewall is enabled for the endpoint, etc.

System Hygiene: users who practice good system hygiene tend to have a lower propensity for compromise. Examples of "good" system hygiene include but are not limited to: configuring an endpoint to perform regular system backups (e.g., Time Machine configured on a Mac), keeping a relatively clean system desktop, organizing files neatly into well-structured folders, keeping an empty recycle or trash bin, limiting the number of auto-start applications, keeping a relatively small number of applications in a dock or system tray, etc.

Past Susceptibility: users whose systems have been compromised recently (e.g., as evidenced by anti-virus software alerts) are more likely to get compromised in the future. In other words, some embodiments may consider past behavior as a predictor of future performance. The type of past compromise may be further analyzed or broken down, depending for example on the severity of a past incident (e.g., whether malicious software was merely found on the endpoint or whether it was actually executed, the nature of the malicious software such as whether it was a particularly pernicious threat like ransomware or a milder threat like adware, etc.) and the cause of the incident. This information may be exposed by other technology, such as anti-virus software, and thus may be extracted from or referenced from such other technology.

Critical Data: the endpoint monitoring components 310-1 may further analyze an endpoint to determine whether the data stored on the endpoint is critical as defined by some designated criteria (e.g., importance to an organization or other enterprise). The local data on a system or device may be monitored to determine criticality based on such criteria. Examples of criteria include determining whether a user has a large number of recent files that are deemed confidential, whether the user has proprietary source code files or engineering design documents, whether sensitive data (e.g., health records) is stored, etc.

Critical Access: the endpoint monitoring components 310-1 may also monitor endpoints to determine whether the endpoints access other critical systems in the enterprise system 310. Further, endpoints may be monitored to determine if the endpoints contain stored credentials that can be used to access other critical systems that may be outside the enterprise system 310 (e.g., Amazon AWS keys, stored passwords, etc.).

Location: users who tend to have changing locations and are heavily mobile (e.g., logging in from coffee shops, free WiFi hotspots, hotel rooms, other dangerous geographies) may have a higher propensity of getting compromised.

Email Habits: a user's email or more generally communication habits can indicate the user's propensity to get compromised. For example, if a user receives excessive email from external sources, their associated propensity of getting compromised is generally higher. How a user handles email may also be indicative of their propensity for compromise. For example, a user that consistently opens externally sourced email attachments, especially those attachments with a higher likelihood to be malware droppers (e.g., portable document format (PDF) files, Microsoft Office documents, etc.) can be considered a higher risk. Additionally, users that utilize "Reply-All" to email messages sent to a large number of users may indicate that the user is less sophisticated in proper email etiquette and, as a result, may be prone to behavior that puts them at a higher risk.

While endpoint monitoring components 310-1 may theoretically provide the most in-depth detail regarding user activity, it is not always possible to monitor an endpoint directly. For example, it may not be possible to install endpoint monitoring components 310-2 on certain systems, devices or other endpoints. The network monitoring components 310-2 provide one mechanism for indirectly monitoring endpoints by seeing what traffic is emanating from and going to the endpoint in question. Details collected by the network monitoring components 310-2 include, but are not limited to, traffic to other relevant systems, traffic to external systems, traffic from high risk areas, traffic to and from high risk areas, etc. Illustrative examples of such information will now be described.

Traffic to Other Relevant Systems: certain systems may be primarily accessed by sophisticated users who have a lower propensity for compromise. For example, a user who is checking in or checking out code from a source control system (e.g., GitHub) is less likely to be compromised than a user that accesses other types of systems. Along similar lines, the systems being accessed can be indicative of user criticality as well. For example, users who access financial reporting systems, customer relationship management (CRM) systems, and the like may have a higher impact score assigned to them. Further, it should be noted that the magnitude of impact can vary depending on the organization or other enterprise. For example, is an organization or other enterprise that places a greater value on their brand reputation relative to other attributes (e.g., intellectual property) may weight the impact for users who control key social media accounts more heavily than other users.

Traffic to External Systems: users who spend excessive amounts of time browsing external systems unrelated to their role within an organization or other enterprise may have a higher propensity of being compromised. For example, a financial officer that spends an excessive amount of time browsing social media may have a higher propensity of being compromised. It should be appreciated, of course, that for other types of users browsing social media may not have a higher propensity of being compromised (e.g., for users in charge of branding, outreach, marketing, etc.). Along similar lines, users who visit sites meant for more sophisticated users (e.g., Stack Exchange) may have a lower propensity for becoming compromised.

Traffic from High Risk Areas: performing geographic IP lookups can help to identify network traffic emanating from a device that suggests the user is in an area where the user is more susceptible to compromise (e.g., non-work network connections, free mobile hotspots, hotel rooms, high risk geography, etc.). It should be noted that this approach is not always perfect, as IP addresses can be network address translated (NAT'ed), but this uncertainty can be incorporated into how this information is weighed relative to other information in developing a risk score for a user.

Traffic to and from High Risk Areas: similar to the above, geographic IP lookups can help to identify network traffic going to and coming from areas that could lead to a user being more susceptible to compromise. For example, traffic to and from a dangerous geographic from a cybersecurity perspective (e.g., traffic between the United States and China) could point to a user who is more likely to be compromised.

From the perspective of analyzing user risk, an organization or other enterprise in some embodiments treats cloud infrastructure as an essential extension of the enterprise infrastructure, even if the cloud infrastructure is managed by a third party (e.g., Infrastructure as a Service (IaaS) or SaaS providers). Traffic to and from cloud services can be monitored using cloud monitoring components 310-2 on an endpoint itself, on an enterprise network (e.g., if a user connects to the cloud service from the enterprise network), through a proxy system including both forward and reverse proxy systems (e.g., if the organization or other enterprise mandates that traffic to certain services has to go through a common conduit as they may for technologies such as Single Sign On (SSO) instances), through application programming interfaces (APIs) offered by cloud providers, etc.

These various sources of information are all beneficial, but may offer varying tradeoffs. For example, monitoring cloud services on the endpoint is comprehensive, but it is not always possible to deploy such monitoring capabilities directly onto the endpoint. Monitoring on the network is typically easier than endpoint-based monitoring, but it may not be possible to monitor traffic on networks which the organization or other enterprise has no control over (e.g., a user connecting to a cloud service from home). Moreover, traffic to and from cloud services may be encrypted over the network (e.g., through Secure Socket Layer (SSL), Transport Layer Security (TLS), etc.), obscuring potentially relevant data.

Proxy systems can help address the encryption issue through man-in-the-middle (MITM) decryption, but it is not always possible to force traffic to and from proxy systems, and such proxy systems may be cumbersome to set up and can create operational risks (e.g., the risk of the proxy failing and preventing a user from accessing a business critical application hosted by a SaaS cloud service). In some cases, cloud service providers can help facilitate enforcement through proxy systems. For example, the cloud service providers may be configured to restrict the locations from which they will accept a connection. In these cases, the cloud services can be configured to only accept connections coming from the IP addresses of pre-specified monitoring proxies. API monitoring can be much easier to set up relative to proxy systems, but monitoring is restricted to the capabilities provided by the APIs.

Cloud monitoring components 310-3 may be used to collect various information useful in determining user risk, including but not limited to the types of services being accessed, data accessibility, and user hygiene and habits. Illustrative examples of such information will now be described.

Types of Services Being Accessed: the services (e.g., SaaS cloud services) being accessed can point to the sophistication of a user. For example, users who access source control systems like GitHub are likely to be more sophisticated and therefore less susceptible to compromise. Along similar lines, the types of SaaS cloud service being accessed can also point to potential impact. For example, logging into a CRM system (e.g., Salesforce.com points to a user who has access to potentially sensitive customer data.

Data Accessibility: the data being accessed using cloud services can be used to indicate both susceptibility to compromise and severity or impact of compromise. For example, in the context of a SaaS file sharing service (e.g., Box.com, Dropbox®, Syncplicity®, OneDrive®, etc.), a user who accesses highly technical documents is likely to be more sophisticated and less susceptible to compromise. API access can provide detailed granularity into the data being provided. For example, Box.com offers an API that allows one to directly examiner the contents of files stored on the Box.com file sharing service. Along similar lines, the impact of a compromise associated with a person who accesses or has access to confidential documents may be higher. Along these lines, given that SaaS file sharing offerings are designed to make it easy to share files, the graphical structure of what can be accessed by a particular user is germane in the context of risk. A user may not create many native files, but may have access to shared folders that are sensitive.

User Hygiene and Habits: the habits of a user on a system can monitored for susceptibility and impact of compromise. For example, users who share documents externally may have a higher impact score. Along similar lines, users who receive many documents from external sources may have a higher susceptibility of compromise.

Gateway systems may be thought of as a specific type of endpoint, though there are some important considerations to bear in mind when monitoring gateways utilizing gateway monitoring components 310-4. In particular, some gateway systems are used to provide a common conduit for other endpoints. For example, the EdgeX Gateway can act as a common conduit by which IoT devices can connect to the Internet. By monitoring the activity on the gateway utilizing gateway monitoring components 310-4, insights can be gleaned regarding the devices that are connected to the gateway. While monitoring the gateway may not yield the depth of device-level visibility as having monitoring logic directly on the IoT devices themselves, gateway monitoring components 310-4 may be easier to deploy and potentially provide a healthy tradeoff between visibility, convenience and cost.

As noted above, the various monitoring components 301 can feed observed outputs and information about associated entities to the entity resolution component 302. The entity resolution component 302 takes input from the monitoring components 301. In addition, the entity resolution component 302 may draw data from existing systems, such as those that manage user identities (e.g., Active Directory or Identity, Governance and Lifecycle systems). The entity resolution component 302 seeks to associate transactional data to a given user, together with an optional confidence score that represents how likely it is for a given transaction to be associated with a given user. Such information can lead to improved downstream performance and risk assessment.

Various entity resolution techniques may be used by the entity resolution component 302. IP addresses, MAC addresses, user names, email addresses, machine names, host names and the like can all be indicators of which user or entity is actually involved in a transaction. In some cases, these entities may be linked. For example, the endpoint monitoring components 310-1 can obtain the host name of a system, the IP address of that system, and other similar identifiers. In doing so, mappings can be established between these attributes. Some attributes are helpful on their own, but may not always be sufficient for identifying the underlying entity. For example, an IP address can be associated with multiple entities. However, in conjunction with other data such as the application or applications being accessed, the time of access, etc., the entity resolution component 302 can narrow down which specific entity conducted a transaction from a particular IP address at a particular time.

In some embodiments, the entity resolution component 302 utilizes data normalization techniques including but not limited to tokenization, schema normalization, text normalization, approximate matching (e.g., using Levenshtein distance between strings, using the Smith-Waterman algorithm for local alignment of sequences), etc. The entity resolution component 302 may also or alternatively utilize document similarity measures, including but not limited to term frequency-inverse document frequency (TF-IDF), cosine similarity, set similarity, etc. The entity resolution component may further or alternatively utilize clustering algorithms, including but not limited to k-means clustering, spectral clustering, etc. Through application of these and other techniques, data being collected through the monitoring components 301 and the entity associated with that data as derived through the entity resolution component 302, together with information from the risk register component 303, can be passed to the risk scoring engine 304.

The risk register component 303, in some embodiments, provides a mechanism for obtaining risk information and may be thought of as a common place where risk information is stored or otherwise made accessible. In some embodiments, an IRM or GRC system can act as the risk register component 303 for a particular organization or other enterprise. While various embodiments focus on the risk associated with specific users, it should be appreciated that the risk register component 303 may also contain various other information, such as asset importance information for the assets of enterprise system 310 that may be utilized to characterize impact of compromise of a user with access to or control over such assets.

The risk register component 303 may be fed data from various sources, including enterprise systems knowledge store 330-1 and user input 330-2. Data from these and other sources includes but is not limited to organizational chart placement, organizational role, fugacious roles, critical processes, critical assets, entitlements and delegations, etc. Illustrative examples of such information will now be described.

Organizational Chart Placement: a user's place in an organization chart is valuable information when it comes to assessing risk. For example, individuals who are high up in the organizational chart would generally be associated with higher risk scores, because compromising their systems could have greater impact on the organization or other enterprise. It should be noted that the risk score itself may be a function of time. For example, the risk score associated with the CFO can be deemed higher during a financial quiet period, since any information compromised during this time can lead to especially undesirable consequences. In addition to executives of an organization or other enterprise, some embodiments associate higher risk scores to those who may work closely with the executives (e.g., executive assistants). Information about organizational chart placement can be input manually via user input 330-2, or may be pulled from a variety of systems including but not limited to human resources (HR) systems and identity services (e.g., Active Directory) from enterprise systems knowledge store 330-1.

Organizational Role: similar to examining organizational chart placement, examining the role that a user has in an organization or other enterprise can provide similar insights into risk. For example, certain roles may be associated with functions possessing or having access to data that is particularly sensitive (e.g., a finance function may know about performance metrics, a legal function may possess sensitive legal documents, an engineering function may have access to core intellectual property, a marketing function may have access to customer data, etc.). While the number of users who have access to sensitive data in an organization or other enterprise may be multitudinous, the relative risks could vary by enterprise. For example, an engineering organization may put more weight on intellectual property, which in turn means assigning higher risk scores to individuals in that function compared to legal. As another example, an organization operating in a heavily regulated industry (e.g., health care) may put more emphasis on legal and finance functions when it comes to risk.

Fugacious Roles: in some organizations and other enterprises, a small cross-functional and cross-hierarchical team may be assigned to work on highly sensitive projects, possibly requiring an additional internal non-disclosure agreement (NDA). Examples of such programs include prospective mergers and acquisitions. In this case, the team assigned to work on the merger or acquisition will typically be required to maintain the secrecy of the project—even from their peers and possibly even from users who are at a higher level in the organizational chart. Information about users involved in such projects may be provided to the risk register component 303. It should be noted that information about the nature of the project need not be provided to the risk register component 303, just the users involved possible along with some designated importance of the project for analyzing impact. Once the project is completed, the information may be removed from the risk register component 303.

Critical Processes: organizations and other enterprises often track critical processes (e.g., critical business processes). For example, organizations and other enterprises may do so either manually or by leveraging an impact analysis module in their IRM or GRC system. If such processes involve key personnel, the risk associated with these users can be raised.

Critical Assets: along with tracking critical processes, impact analysis modules can help identify which assets of the enterprise system 310 are critical (e.g., an asset can be deemed critical if it is involved in one or more critical processes). The impact scores of the users associated with these assets can be raised accordingly.

Entitlements and Delegations: knowing which assets or applications a user is entitled to access can be useful in identifying risk scores. This information can be entered in manually, or may be gleaned from Identity Governance and Lifecycle (IGL) systems. Users who are allowed to access important assets or applications can have their risk scores raised accordingly. Similarly, some users may delegate access privileges to certain applications. For example, executive assistances may have access to the email of any executives they support. In this case, the risk associated with the user to whom entitlements are delegated should be amended accordingly.

The risk register component 303 can leverage existing systems (e.g., enterprise systems knowledge store 330-1) and can take in such data manually (e.g., via user input 330-2). This data, together with the results of the entity resolution component 302, is provide to the risk scoring engine 304.

The risk scoring engine 304 takes input from the entity resolution component 302 and the risk register component 303. The risk scoring engine 304 identifies, utilizing a scoring mechanism, the users who pose the greatest potential risk to an organization or other enterprise. The risk scoring engine 304, in some embodiments, outputs metadata for the purpose of orchestrating and automating responses or remedial actions associated with the determined risk scores. The risk scoring engine 304 may utilize various techniques for combining the information from the entity resolution component 302 and the risk register component 303 to generate overall risk scores for particular users or groups of users. In some embodiments, the users may be clustered or otherwise grouped, and the risk scoring engine 304 may calculate risk scores for just a subset of the users within a particular cluster or group that are then extrapolated to other members of that cluster or group, or to other clusters or groups having some designated relationship with that cluster or group.

In some embodiments, the risk scoring engine 304 may utilize hand-coded heuristics, weighted averages of different attributes (e.g., where the weights may be selected manually), decision trees based on different attributes, machine learning based approaches, etc. for determining risk scores.

To compute a risk score (e.g., a likelihood that a user or entity will get compromised based on what attributes are observed about that user or entity), machine learning approaches including supervised statistical machine learning techniques. In this case, the feature vectors can be derived from the attributes that are obtained from the entity resolution component 302, and one feature vector can be associated with a given entity. The label associated with a given feature can indicate whether or not the given entity or user in question has been the victim of an incident within a specified period of time. Organizations and other entities that deploy antivirus, next generation antivirus, or endpoint threat detection and response technologies may already have data on which users or entities have been infected with computer viruses, malware, adware, etc. Organizations and other enterprises may also be able to glean this type of data from firewall and next generation firewalls logs, as well as Instruction Prevention and Detection System logs, which can indicate entities from which malicious traffic emanated. In this manner, a corpus of labeled training data comprising these features vectors and their corresponding labels can be constructed.

Supervised learning algorithms (e.g., Naïve Bayes, logistic regression, decision trees, random forests, neural networks, etc.) can be applied to this training data corpus. If a statistical learning method is used, then the resulting model can yield an interpretable probability of potential compromise. Another machine learning approach that may be useful in providing an interpretable result is k-nearest neighbor algorithms, where the score can represent the distance between a given user or entity and one whose label is known (as measured by a weighted distance of the features vectors formed via the entity resolution component 302).

Given the potential complexity of the training set, machine learning approaches that handle high-dimensional data with potentially missing attributes may be useful. Along similar lines, for these types of applications "explainability" of the result may be desirable as specific remediation actions can be suggested. Explainability in this context refers to the notion that some machine learning algorithms produce models whose decisions are easy to explain to someone with less expertise in the field. If a model produces an explainable result, it will generally deemed more trustworthy. Some approaches, such as logistic regression and decision trees, lend themselves to easily explainable results. However, even in the absence of easily interpretable classifiers, techniques may be used to help with interpretability.

In additional to statistical machine learning approaches, other design approaches discussed above can be applied to either the data as a whole or a subset of the data. Further, some embodiments may combine various approaches discussed above. For example, a decision tree can be applied to a subset of the attributes and a weighted average can be applied to a possibly different subset of attributes. A heuristic can then be applied to the results from the decision tree and the weighted average. One benefit of such a multi-level approach is that large numbers of attributes may be combined in small groups that are easier to handle. For example, in the manner it is easier to start at a top-most score and see how that score was derived from lower-level scores. The lower-level scores can be computed based on common attributes. For example, the top-most score can be broken up into scores associated with each of the monitoring components 301 and the risk register 303 (e.g., an endpoint score, a network score, a cloud score, a gateway score and a risk register score). These scores can, in turn, be broken up further. For example, the endpoint score can be broken up into a score for the configuration of the endpoint, the applications installed on the endpoint, the browsing habits on the endpoint, the criticality of the endpoint, etc. Each of these score may be broken down even further if desired.

In this manner, the selection of appropriate remedial actions may become more evident. For example, if a low risk score is attributable to poor endpoint configuration, then special emphasis can be put on remedial actions to amend or modify the configuration of the endpoint to a superior, substitute configuration. Alternatively, if a low score is attributable to poor e-mail or other communication habits, additional training may be designated for specific users.

As part of coming up with a unified risk score that ties together other disparate risk scores, some embodiments may normalize risk scores so that they are easy to interpret relative to one another. Various techniques may be used for normalization. For example, the softmax function can take an n-dimensional vector whose elements are part of an arbitrarily large (real-valued) range and can map it to another n-dimensional vector whose values are each between 0 and 1, and whose values sum to 1 thus allowing them to be interpreted as a probability.

It should be appreciated that the particular examples of techniques for computing risk scores in the risk scoring engine 304 discussed above are presented by way of illustration only, and that many variations and alternatives may be used in other embodiments. The results of the risk scoring engine 304, including both the risk scores and optional metadata, is passed to the ROAR component 305.

The ROAR component 305 takes information about risk scores, and optionally metadata about the risk scores as noted above, and uses this information to initiate a set of remedial actions to mitigate or lower the risk posed by various users. The ROAR component can also take manual input and utilize one or more action profiles 350 the help dictate the nature of the response. The remedial actions may fill into one of a plurality of categories, including but not limited to manual action, ticketing, automation, combinations thereof, etc. Manual remedial actions refer to remedial actions where various steps are performed manually by one or more users of the enterprise system 310 (e.g., users associated with host or security agents as noted above). Ticketing remedial actions may be used with a workflow ticketing systems used to ensure that key tasks are handled as part of the response. Automated remedial actions can also be used. For example, if a user is deemed to be high risk, additional security software can automatically be deployed onto their system, device or other endpoint. In some cases, highly tailored actions can be taken. For example, if the risk score of a user is attributable to them visiting high risk regions (e.g., China), then their systems can be scanned against threat intelligence about specific attacks known to be prevalent in those high risk regions (that otherwise may not be scanned against). The use of multi-level risk scores can facilitate tailoring of the remedial actions as discussed above. In some cases, a workflow or remedial actions may be partially automated but still require some manual intervention for key areas. Such manual intervention may include, for example, a user approving an automated action via a security or host agent as described above.

There are numerous types of remedial actions that can be taken in response to the user risk analysis. Various examples of such remedial actions will now be described, though it should be appreciated that the particular examples given are present by way of illustration only, and that embodiments are not limited to use with these specific remedial actions. Remedial actions include, but are not limited to sending a user an automatic message (e.g., via email, text, instant messaging, etc.) to raise awareness about their user risk being high. The automatic message, in some embodiments, may include suggested actions for reducing user risk. Such suggestions may be determined by drilling down into the contributing factors to that user's risk score via multi-level risk scores as described above.

It should be noted that a high risk score generally refers to a risk score above some designated threshold, which may be set by an operator or administrator of the enterprise system 310. The designated threshold may also be determined automatically, such as by considering the top X number of users, or the top Y percentage of risk scores as being "high." As noted above, the risk score for a user considers not only propensity for compromise but also impact of compromise. The designated threshold may weight propensity and impact as desired for a particular implementation. Risk scores for users may also be ranked, and remedial actions may be taken in accordance with the ranking and possibly information related to the availability of resources for performing remedial actions. For example, remedial actions which utilize fewer computational resources may be performed for users with comparatively lower risk scores if the amount of computational resources available for performing remedial actions in the enterprise system 310 is low.

Remedial actions may also include changing a configuration of a system, device or other endpoint utilized by a user with a high risk score, or in response to detecting a risk situation associated with an endpoint that otherwise communicates with or interacts with the user having the high risk score. Remedial actions may also include putting additional security software onto a system, device or other endpoint. In some embodiments, this includes implementing additional security checks before allowing users with high risk scores to perform certain actions (e.g., which may be determined based on the contributing factors to the user's risk score via multi-level risk scores). Such additional security checks may include requiring authentication, requiring approval or authorization from another user via a security or host agent, etc. One benefit of performing predictive inference of user risk or performing risk analysis first is that the additional software or security checks may be cumbersome and not warranted for every user. The additional time and computing resources necessary for installing additional security software or implementing additional security checks may therefore by focused on users with high risk scores.

Additional remedial actions may include deploying encryption software onto a system, device or other endpoint if that endpoint has many unencrypted files containing sensitive data. The endpoint may be one which is associated with or otherwise accessed by users having a high risk score. Remedial actions may also include revoking or initiating a review for access privileges to resources, particularly for resources that a user may have access to but does not use or rarely users. This remedial action may be prioritized for access privileges that afforce access to critical assets of the enterprise system 310.

In some embodiments, a remedial action includes initiating an attack simulation (e.g., a spear phishing attack) on a user as a means to educate that user. Remedial actions may also include registering a user to a training program for security awareness, and following up to confirm that the user has completed the training program successfully (e.g., which may include initiating one or more attack simulations as described above). Remedial actions may also include changing the security posture of a user's system, device or other endpoint in a fundamental way, such as by moving to a "whitelisting" model from a "blacklisting" model (e.g., where that user is only allowed to access web sites or other resources on the whitelist, rather than being permitted to access any web site or other resource that is not on the blacklist, etc.). In some cases, such changes may be time bound as a user's risk score may be a function of time. For example, risk for a particular user may be temporary in nature (e.g., a CFO during a quiet period). Remedial actions may also include changing identity and access management policies in an organization or other enterprise. For example, the identify and access management policies of enterprise system 310 may be changed, at least temporarily, to require that all access to certain systems by certain users during certain periods require additional authentication factors.

Information associated with user risk (e.g., risk scores and optional metadata) may be fed into one or more other systems that relate to risk management for the enterprise system 310 in addition to the ROAR component 305. Such systems can, in turn, apply additional techniques to understand organizational or enterprise risk by leveraging user risk as one component. Similarly, an organization or other enterprise may seek to consider a broader view of user risk that incorporate multiple elements including cyber risk.

User risk may be considered a critical component of cyber risk. Embodiments may be provided as a service to help organization or other enterprises glean insight into such risk and take actions against those insights. In some cases, the functionality described herein is incorporated into or otherwise used to augment the RSA NetWitness® Platform to monitor digital assets of an enterprise system or the RSA Archer® Platform to act as a broader organizational risk register that can pull in additional context to perform impact analysis. Efforts around user and entity behavior analysis (UEBA) and cloud-based analytics can also be used to develop the risk scoring engine 304 in some embodiments. RSA Security Operations Management (SecOps) may be used to handle workflows. The ROAR component 305 may also be used to create action profiles 350, such as playbooks for the RSA NetWitness® Orchestrator to help organizations and other enterprises take a set of actions to reduce risk.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for determining asset importance will now be described in greater detail with reference to FIGS. 4 and 5. Although described in the context of system 100, these platforms may also be used to implement at least portions of other information processing systems in other embodiments.

Figure 4:
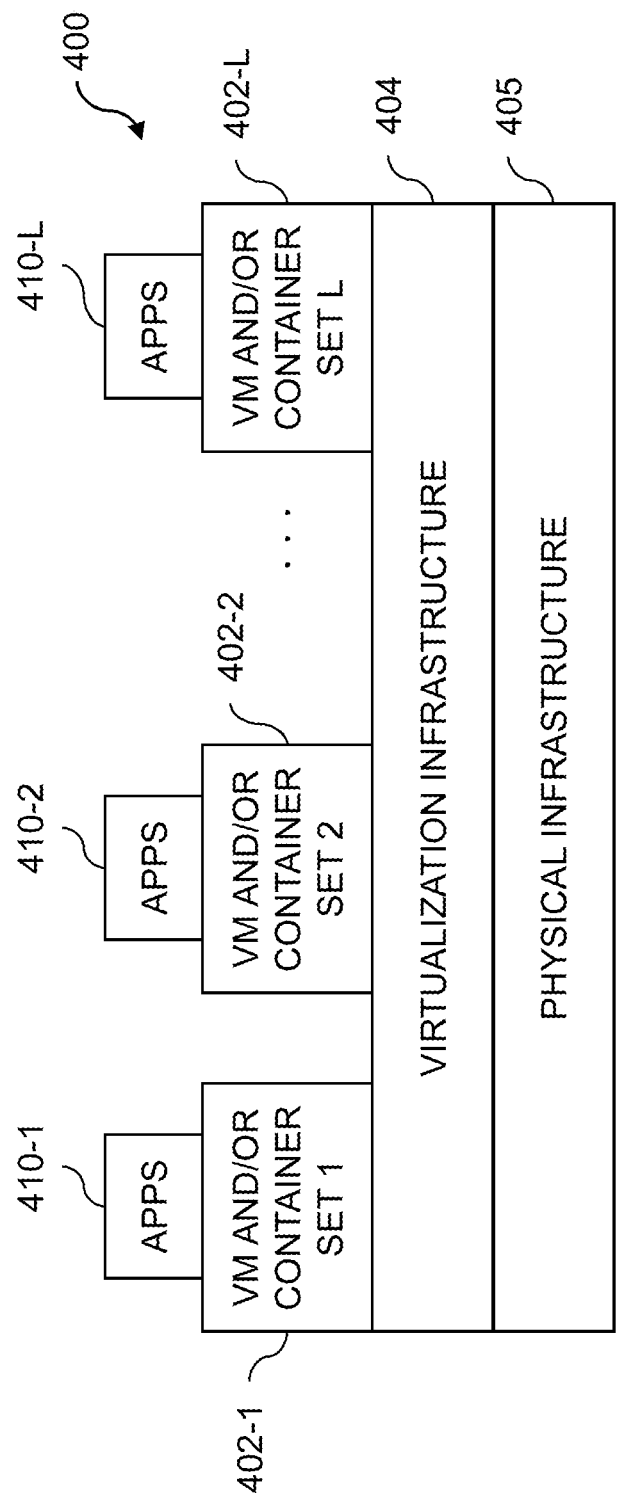

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for predictive inference of user risk as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, enterprise systems, assets, types of user behavior, monitoring tools, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
monitoring user behavior in an information technology infrastructure, wherein monitoring the user behavior comprises monitoring traffic to and from one or more cloud services managed by a third party external to the information technology infrastructure;
identifying a given user of the information technology infrastructure associated with a given portion of the monitored user behavior;
determining a predicted impact of compromise of the given user on the information technology infrastructure, wherein determining the predicted impact of compromise of the given user comprises:
determining a likelihood of compromise of the given user based at least in part on at least one of (i) types of the one or more cloud services utilized by the given user, (ii) data accessed by the given user from the one or more cloud services, and (iii) data provided to the one or more cloud services by the given user; and
determining an overall impact of compromise of the given user based at least in part on a primary impact of compromise at a first time associated with the likelihood of compromise and a secondary impact of compromise at one or more additional times subsequent to the first time associated with the likelihood of compromise;
generating a risk score for the given user based on the predicted impact of compromise and the given portion of the monitored user behavior;
identifying one or more remedial actions to reduce the risk score for the given user; and implementing, prior to detecting compromise of the given user, at least one of the remedial actions to modify a configuration of at least one asset in the information technology infrastructure, the at least one asset comprising at least one of a physical computing resource and a virtual computing resource in the information technology infrastructure;

wherein the method is performed by at least one processing device comprising a processor coupled to a memory.

2. The method of claim 1 wherein monitoring the user behavior utilizes one or more monitoring tools deployed on one or more assets in the information technology infrastructure, the one or more monitoring tools comprising at least one of an endpoint monitoring tool, a network monitoring tool, a cloud services monitoring tool and an Internet of Things (IoT) gateway monitoring tool.

3. The method of claim 1 wherein monitoring the user behavior further comprises analyzing endpoint assets in the information technology infrastructure to determine at least one of:
   browsing habits of one or more users of a given endpoint asset;
   installed applications on the given endpoint asset;
   system configuration of the given endpoint asset;
   system hygiene of the given endpoint asset;
   past susceptibility of the given endpoint asset to compromise;
   critical data stored on the given endpoint asset;
   access by the given endpoint asset to one or more other designated critical assets in the information technology infrastructure;
   location of the given endpoint asset; and
   communication habits of the one or more users of the given endpoint asset.

4. The method of claim 1 wherein monitoring the user behavior further comprises analyzing network traffic of assets in the information technology infrastructure to determine at least one of:
   network traffic from a given asset to one or more designated entities;
   network traffic from the given asset to one or more entities external to the information technology infrastructure;
   network traffic from the given asset while the given asset is located in one or more designated high risk geographic areas; and
   network traffic between the given asset and one or more entities located in the one or more designated high risk geographic areas.

5. The method of claim 1 wherein the one or more cloud services utilized by the given user comprise software-as-a-service applications accessed by the given user.

6. The method of claim 1 wherein monitoring the user behavior further comprises monitoring a set of Internet of Things (IoT) devices via a monitoring tool deployed on an IoT gateway utilized by the set of IoT devices to connect to one or more other assets of the information technology infrastructure.

7. The method of claim 1 wherein identifying the given user of the information technology infrastructure associated with the given portion of the monitored user behavior comprises associating transactional data to the given user utilizing one or more identifiers in the transactional data, the one or more identifiers comprising at least one of an Internet Protocol (IP) address, a Media Access Control (MAC) address, a user name, an email address, a machine name and a host name.

8. The method of claim 1 wherein identifying the given user of the information technology infrastructure associated with the given portion of the monitored user behavior comprises associating transactional data for a given transaction obtained utilizing two or more different monitoring tools to the given user utilizing at least one of data normalization, document similarity measures and one or more clustering algorithms.

9. The method of claim 1 wherein determining the impact of compromise of the given user on the information technology infrastructure is based at least in part on at least one of:
   a placement of the given user on an organizational chart associated with a given enterprise operating the information technology infrastructure; and
   the given user's role within the given enterprise, the given user's role being determined at least in part based on one or more functions of the given user within the given enterprise.

10. The method of claim 1 wherein determining the impact of compromise of the given user on the information technology infrastructure is based at least in part on at least one of:
    association of the given user with one or more critical processes of the information technology infrastructure; and
    association of the given user with one or more assets utilized by the one or more critical processes of the information technology infrastructure.

11. The method of claim 1 wherein determining the impact of compromise of the given user on the information technology infrastructure is based at least in part on at least one of:
    entitlements of the given user to access assets of the information technology infrastructure; and
    access privileges delegated to the given user to access assets of the information technology infrastructure.

12. The method of claim 1 wherein generating the risk score for the given user utilizes at least one of a heuristic algorithm, a weighted average of two or more of a plurality of risk attributes of the given user, a decision tree based on two or more of the plurality of risk attributes of the given user, and a machine learning algorithm.

13. The method of claim 1 wherein the risk score for the given user is a function of time.

14. The method of claim 1 wherein generating the risk score for the given user comprises generating a multi-level risk score, the multi-level risk score comprising an overall risk score at a top level and two or more lower-level risk scores, the overall risk score being a function of the two or more lower-level risk scores.

15. The method of claim 14 wherein the two or more lower-level risk scores comprise:
    an impact risk score based at least in part on the predicted impact of compromise of the given user; and
    two or more risk attribute scores associated with different types of monitored behavior of the given user.

16. The method of claim 15 wherein the two or more risk attribute scores comprise two or more of:
    a first risk attribute score associated with user behavior monitored on endpoint assets of the information technology infrastructure;
    a second risk attribute score associated with user behavior monitored via network traffic of the information technology infrastructure;
    a third risk attribute score associated with user behavior monitored via the one or more cloud services; and a fourth risk attribute score associated with user behavior monitored via one or more Internet of Things (IoT) device gateways.

17. A computer program product comprising a non-transitory processor-readable storage medium having stored therein program code of one or more software programs, wherein the program code when executed by at least one processing device causes the at least one processing device:

to monitor user behavior in an information technology infrastructure, wherein monitoring the user behavior comprises monitoring traffic to and from one or more cloud services managed by a third party external to the information technology infrastructure;

to identify a given user of the information technology infrastructure associated with a given portion of the monitored user behavior;

to determine a predicted impact of compromise of the given user on the information technology infrastructure, wherein determining the predicted impact of compromise of the given user comprises:

determining a likelihood of compromise of the given user based at least in part on at least one of (i) types of the one or more cloud services utilized by the given user, (ii) data accessed by the given user from the one or more cloud services, and (iii) data provided to the one or more cloud services by the given user; and determining an overall impact of compromise of the given user based at least in part on a primary impact of compromise at a first time associated with the likelihood of compromise and a secondary impact of compromise at one or more additional times subsequent to the first time associated with the likelihood of compromise;

to generate a risk score for the given user based on the predicted impact of compromise and the given portion of the monitored user behavior;

to identify one or more remedial actions to reduce the risk score for the given user; and to implement, prior to detecting compromise of the given user, at least one of the remedial actions to modify a configuration of at least one asset in the information technology infrastructure, the at least one asset comprising at least one of a physical computing resource and a virtual computing resource in the information technology infrastructure.

18. The computer program product of claim 17 wherein generating the risk score for the given user comprises generating a multi-level risk score, the multi-level risk score comprising an overall risk score at a top level and two or more lower-level risk scores, the overall risk score being a function of the two or more lower-level risk scores.

19. An apparatus comprising:

at least one processing device comprising a processor coupled to a memory;

the at least one processing device being configured:

to monitor user behavior in an information technology infrastructure, wherein monitoring the user behavior comprises monitoring traffic to and from one or more cloud services managed by a third party external to the information technology infrastructure;

to identify a given user of the information technology infrastructure associated with a given portion of the monitored user behavior;

to determine a predicted impact of compromise of the given user on the information technology infrastructure, wherein determining the predicted impact of compromise of the given user comprises:

determining a likelihood of compromise of the given user based at least in part on at least one of (i) types of the one or more cloud services utilized by the given user, (ii) data accessed by the given user from the one or more cloud services, and (iii) data provided to the one or more cloud services by the given user; and determining an overall impact of compromise of the given user based at least in part on a primary impact of compromise at a first time associated with the likelihood of compromise and a secondary impact of compromise at one or more additional times subsequent to the first time associated with the likelihood of compromise;

to generate a risk score for the given user based on the predicted impact of compromise and the given portion of the monitored user behavior;

to identify one or more remedial actions to reduce the risk score for the given user; and to implement, prior to detecting compromise of the given user, at least one of the remedial actions to modify a configuration of at least one asset in the information technology infrastructure, the at least one asset comprising at least one of a physical computing resource and a virtual computing resource in the information technology infrastructure.

20. The apparatus of claim 19 wherein generating the risk score for the given user comprises generating a multi-level risk score, the multi-level risk score comprising an overall risk score at a top level and two or more lower-level risk scores, the overall risk score being a function of the two or more lower-level risk scores.

* * * * *